US012237709B2

(12) United States Patent
Kiyohiro et al.

(10) Patent No.: US 12,237,709 B2
(45) Date of Patent: Feb. 25, 2025

(54) ELECTRIC POWER SUPPLY APPARATUS

(71) Applicant: HONDA MOTOR CO., LTD., Tokyo (JP)

(72) Inventors: Yukihiko Kiyohiro, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 18/120,266

(22) Filed: Mar. 10, 2023

(65) Prior Publication Data
US 2023/0216329 A1 Jul. 6, 2023

Related U.S. Application Data

(63) Continuation of application No. PCT/JP2020/035126, filed on Sep. 16, 2020.

(51) Int. Cl.
*H02J 7/34* (2006.01)
*H02J 7/00* (2006.01)

(52) U.S. Cl.
CPC .............. *H02J 7/34* (2013.01); *H02J 7/0013* (2013.01); *H02J 7/0048* (2020.01); *Y02T 10/62* (2013.01); *Y04S 10/126* (2013.01)

(58) Field of Classification Search
CPC ........... H02J 7/34; H02J 7/0013; H02J 7/0048
See application file for complete search history.

(56) References Cited

U.S. PATENT DOCUMENTS

| | | | |
|---|---|---|---|
| 6,991,053 B2 * | 1/2006 | Kuang | B60L 58/14 180/65.235 |
| 2014/0172214 A1 * | 6/2014 | Kim | B60L 15/2045 903/906 |
| 2019/0105993 A1 * | 4/2019 | Fujiyoshi | B60W 20/10 |
| 2020/0207328 A1 * | 7/2020 | Adachi | B60L 50/16 |
| 2020/0358287 A1 | 11/2020 | Takada et al. | |
| 2020/0408847 A1 | 12/2020 | Takada et al. | |

FOREIGN PATENT DOCUMENTS

| | | |
|---|---|---|
| JP | 2012-224187 A | 11/2012 |
| JP | 2013-201840 A | 10/2013 |
| JP | 2019-146330 A | 8/2019 |
| JP | 2019-164057 A | 9/2019 |

OTHER PUBLICATIONS

International Search Report dated Nov. 10, 2020, issued in counterpart International Application No. PCT/JP2020/035126, with English Translation. (5 pages).
International Preliminary Report on Patentability (Form PCT/IPEA/409) of International Application No. PCT/JP2020/035126 dated Nov. 16, 2021. (11 pages).

* cited by examiner

Primary Examiner — Daniel Cavallari
(74) Attorney, Agent, or Firm — WHDA, LLP

(57) ABSTRACT

The present invention provides an electric power supply apparatus that supplies power to an external load, characterized by comprising: a generator capable of generating electric power by motive power of an engine; a container capable of housing a battery; a first detector configured to detect a remaining amount of the battery housed in the container; a determining unit configured to determine a maximum amount of electric power that can be output from the electric power supply apparatus, on the basis of a result of detection by the first detector; and a notifying unit configured to notify a user of the maximum amount of electric power determined by the determining unit.

10 Claims, 5 Drawing Sheets

ELECTRIC POWER SUPPLY APPARATUS

CROSS-REFERENCE TO RELATED APPLICATION(S)

This application is a continuation of International Patent Application No. PCT/JP2020/035126 filed on Sep. 16, 2020, the entire disclosures of which is incorporated herein by reference.

BACKGROUND OF THE INVENTION

Field of the Invention

The present invention relates to an electric power supply apparatus that supplies electric power to an external load.

Description of the Related Art

Japanese Patent Laid-Open No. 2012-224187 discloses a hybrid generator capable of outputting electric power from a battery and electric power from an engine generator driven by an engine. In the hybrid generator described in Japanese Patent Laid-Open No. 2012-224187, distribution of output from the generator and output from the battery is determined in consideration of the presence or absence of a load and a remaining amount of the battery, and an output instruction is given to an engine control unit and a battery control unit according to the distribution.

Although it is necessary to select possible output of the generator corresponding to a required electric load, engine output of the generator can be reduced by the electric power of the battery by using the hybrid generator that cooperates with the battery. Meanwhile, in the hybrid generator, for example, the maximum amount of electric power that can be output may vary according to a capacity of the housed battery. Therefore, when supplying electric power to the external load, a user may want to ascertain the maximum amount of electric power that can be output from the hybrid generator, for example, whether the maximum amount of electric power that can be currently obtained by the hybrid generator is appropriate for supplying electric power to the external load. In other words, it is desirable, from the viewpoint of the convenience of the user, to enable the user to ascertain the maximum amount of electric power that can be output in the hybrid generator.

SUMMARY OF THE INVENTION

The present invention provides, for example, a technique that is advantageous in terms of the convenience of a user in a hybrid generator.

According to the present invention, there is provided an electric power supply apparatus that supplies power to an external load, comprising: a generator configured to generate electric power by motive power of an engine; a container configured to house a battery; a first detector configured to detect a remaining amount of the battery housed in the container; a calculation unit configured to calculate an amount of electric power that can be generated by the generator, on the basis of an actual measurement value of an amount of electric power generated by the generator during a period from present time to a predetermined period ago; a determining unit configured to determine a maximum amount of electric power that can be output from the electric power supply apparatus at a present point of time in a case of using both electric power from the generator and electric power from the battery, on the basis of the remaining amount of the battery detected by the first detector and the amount of electric power calculated by the calculation unit; and a notifying unit configured to notify a user of the maximum amount of electric power determined by the determining unit.

Further features of the present invention will become apparent from the following description of exemplary embodiments with reference to the attached drawings.

DESCRIPTION OF THE EMBODIMENTS

Figure 1:
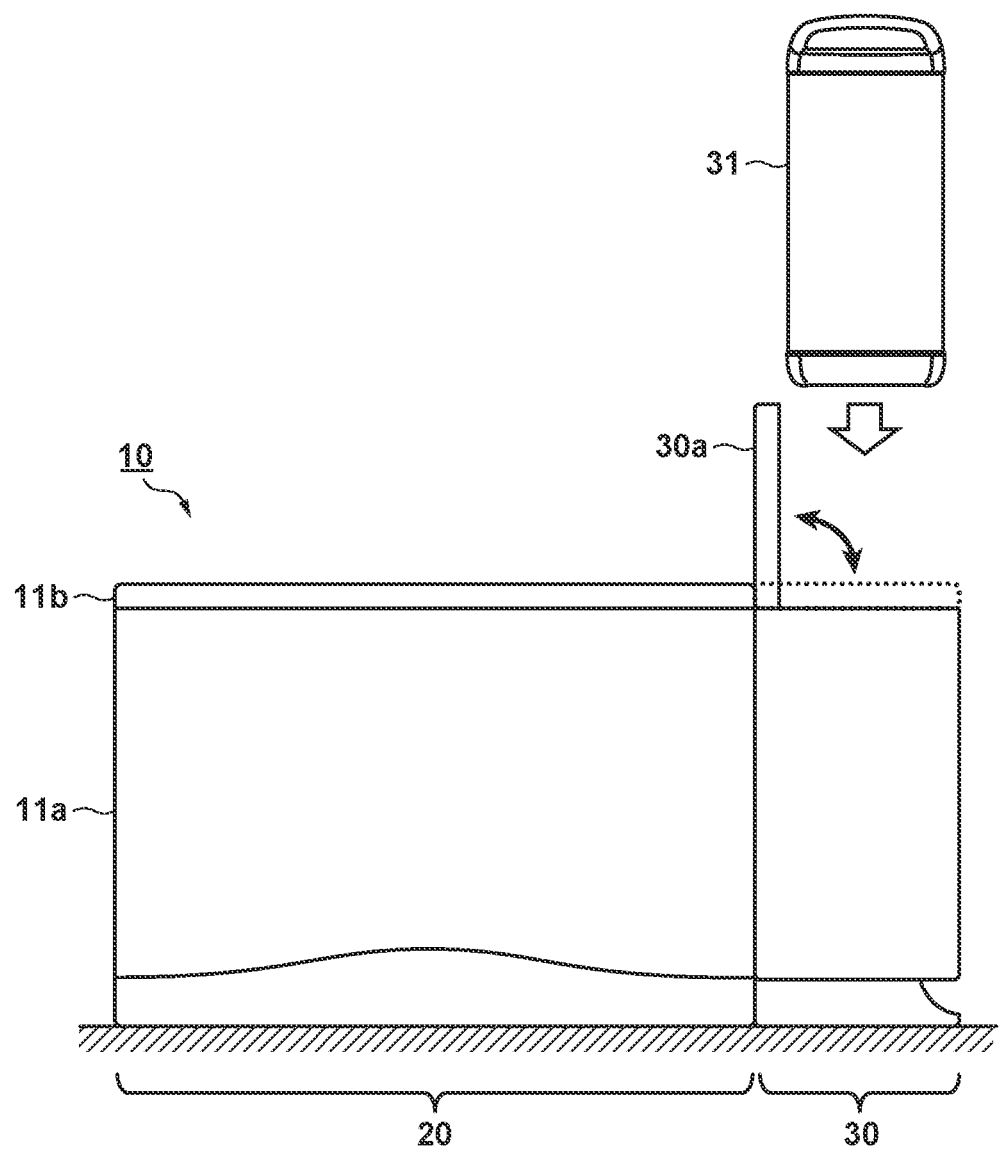
FIG. 1 is an external view of an electric power supply apparatus.

Hereinafter, embodiments of the present invention will be described with reference to the accompanying drawings. Each drawing is a schematic diagram illustrating a structure or a configuration of the embodiments, and the size of each of illustrated members does not reflect actual size. The same reference numerals denote the same or like components throughout the accompanying drawings, and Description of overlapped contents in this specification will be omitted.

Figure 2:
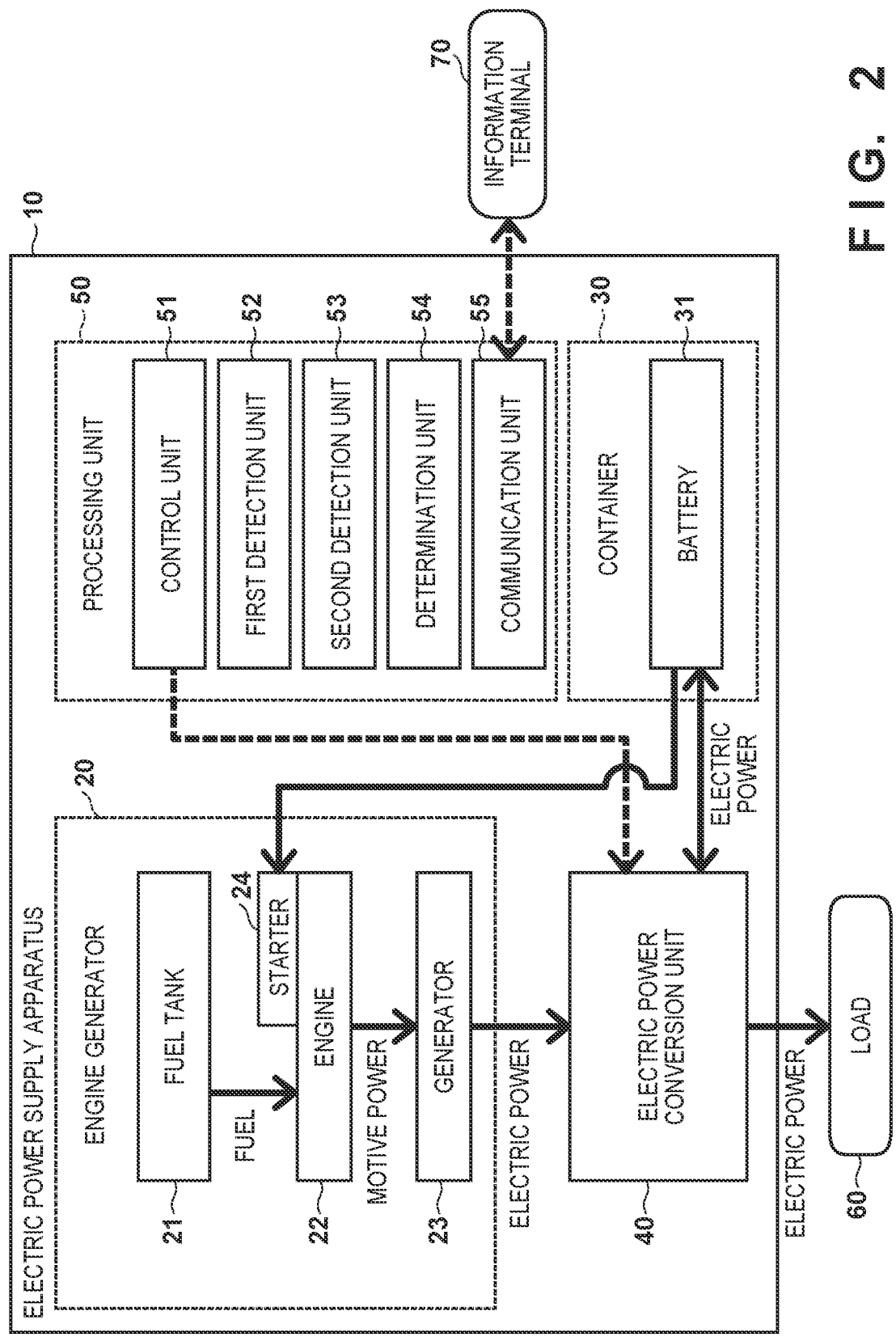
FIG. 2 is a block configuration diagram of the electric power supply apparatus.

An electric power supply apparatus 10 (power supply system) according to an embodiment of the present invention will be described. FIG. 1 is an external view of the electric power supply apparatus 10 according to the present embodiment, and FIG. 2 is a block configuration diagram of the electric power supply apparatus 10 according to the present embodiment. The electric power supply apparatus 10 of the present embodiment is a stationary hybrid generator including an engine generator 20 capable of generating electric power by motive power of an engine and a container 30 capable of housing a battery 31, and is configured to be able to selectively supply electric power from the engine generator 20 and electric power from the battery 31 to an external load 60. The engine generator 20 is disposed inside a housing unit 11a having an openable and closable lid unit 11b, and the container 30 is attached to the housing unit 11a. The container 30 has an openable and closable lid unit 30a in an upper portion and is configured so that the battery 31 can be inserted into and removed from (attached to and detached from) the container 30 with the lid unit 30a opened. Although only one battery 31 is illustrated in an example illustrated in FIG. 1, the container 30 is preferably configured to be able to house a plurality of batteries 31. In addition, the battery 31 can be, for example, a portable battery mounted on an electric vehicle (electric two-wheeled vehicle, electric four-wheeled vehicle, or the like).

As illustrated in FIG. 2, the engine generator 20 may include, for example, a fuel tank 21, an engine 22, and a generator 23. The fuel tank 21 is a tank that stores fuel (gasoline or the like) of the engine 22, and the tank 21 can be refueled while the lid unit 11b of the housing unit 11a is opened. The engine 22 is an ignition-type air-cooled engine using, for example, gasoline or the like as fuel, and has a piston that reciprocates in a cylinder and a crankshaft that rotates in synchronization with the piston. Motive power of the engine 22 is output (transmitted) to the generator 23 via the crankshaft. In addition, the crankshaft is provided with a starter 24 (starter motor), and the engine 22 can be started by driving the starter 24 by the electric power from the battery 31. The generator 23 is, for example, a multipolar alternator that is driven by the motive power of the engine 22 to generate alternating-current power, and has a rotor that is connected to the crankshaft of the engine 22 and rotates integrally with the crankshaft and a stator disposed concentrically with the rotor while facing a peripheral surface of the rotor. The rotor may be provided with a permanent magnet, and the stator may be provided with a coil disposed at a phase angle, for example, every 120 degrees.

Electric power generated by the generator 23 is supplied to an electric power conversion unit 40. The electric power conversion unit 40 is a unit that converts the electric power from the generator 23 and the electric power from the battery 31 into electric power to be supplied to the external load 60. In the case of the present embodiment, the electric power conversion unit 40 is disposed inside the housing unit 11a, and can be configured to be able to selectively supply the electric power from the generator 23, the electric power from the battery 31, or both of those kinds of electric power (combined electric power) to the external load 60. For example, the electric power conversion unit 40 rectifies the electric power from the generator 23, steps down the electric power to a predetermined voltage, and furthermore, converts the electric power to an alternating current of a predetermined frequency (for example, a commercial frequency). Then, the electric power conversion unit 40 performs filtering processing and supplies the alternating current to the external load 60. In addition, the electric power conversion unit 40 passes the electric power from the battery 31 through an isolated direct current-to-direct current converter. Then, the electric power conversion unit 40 can combine (sum) the electric power with the electric power from the generator 23 and supply the combined electric power to the external load 60. Note that as a specific configuration of the electric power conversion unit 40, a configuration of an electric power conversion unit described in PTL 1 (Japanese Patent Laid-Open No. 2012-224187) can be applied (adopted).

In addition, the electric power supply apparatus 10 may include a processing unit 50. The processing unit 50 is, for example, an electronic control unit (ECU), and includes a processor represented by a CPU, a storage device such as a semiconductor memory, an interface with an external device, and the like. The storage device stores a program to be executed by the processor, data to be used for processing by the processor, and the like. The processing unit 50 can read the program and execute the program. The processing unit 50 of the present embodiment is disposed inside the housing unit 11a and can include a control unit 51, a first detection unit 52, a second detection unit 53, a determination unit 54, and a communication unit 55 (notification unit).

The control unit 51 controls charging of the battery 31 housed in the container 30 by the electric power from the generator 23, and controls electric power supply to the external load 60 by selectively using the electric power from the generator 23 and the electric power from the battery 31. In the case of the present embodiment, the control unit 51 has a first control mode, a second control mode, and a third control mode as control modes for controlling the electric power supply to the external load 60, and switches the control mode according to a state of the electric power supply apparatus 10. The first control mode is a control mode for controlling the electric power supply to the external load 60 by the electric power from the generator 23 (that is, using only the engine generator 20) without using the electric power from the battery 31 housed in the container 30. The second control mode is a control mode for controlling the electric power supply to the external load 60 by the electric power from the battery 31 housed in the container 30 (that is, using only the battery 31) without using the electric power from the generator 23. The third control mode is a control mode for controlling the electric power supply to the external load 60 by both the electric power from the generator 23 and the electric power from the battery 31 (that is, using both the generator 23 and the battery 31) using, as auxiliary, the electric power from the battery 31 housed in the container 30.

The first detection unit 52 detects a remaining amount of the battery 31 housed in the container 30. For example, in a case where a plurality of batteries 31 is housed in the container 30, the first detection unit 52 can be configured to detect the number of batteries 31 housed in the container 30 and a remaining amount of each battery 31. On the basis of a detection result of the first detection unit 52 configured as described above, the control unit 51 can control the charging of each battery 31 housed in the container 30 and can control the electric power supply to the external load 60 using electric power from each battery 31. In addition, the second detection unit 53 detects a remaining amount (storage amount) of the fuel in the fuel tank 21 (tank). For example, the second detection unit 53 can detect the remaining amount of the fuel using a remaining amount sensor (level sensor or the like) in the fuel tank 21.

The determination unit 54 determines the maximum amount of electric power that can be output from the electric power supply apparatus 10. For example, the determination unit 54 can determine the maximum amount of electric power that can be output from the electric power supply apparatus 10 (that is, can be supplied to the external load 60 by the electric power supply apparatus 10) on the basis of the remaining amount of each battery 31 detected by the first detection unit 52 and an amount of electric power that can be generated by the engine generator 20. The determination unit 54 may set the amount of electric power that can be generated by the engine generator 20 as a rated value (specification value) of the engine generator 20, and may calculate the amount of electric power from an actual measurement value of an amount of electric power generated by the engine generator 20 during a period from the present time to a predetermined period ago. The determination unit 54 may calculate the amount of electric power that can be generated by the engine generator 20 on the basis of the remaining amount of the fuel detected by the second detection unit 53. In addition, the communication unit 55 is communicably connected with an information terminal 70 of a user via a network or the like. Specifically, the communication unit 55 has a function as a transmission unit (notification unit) that transmits (notifies) information to the information terminal 70 via the network or the like and a function as a reception unit that receives information from the information terminal 70 via the network or the like.

Figure 3:
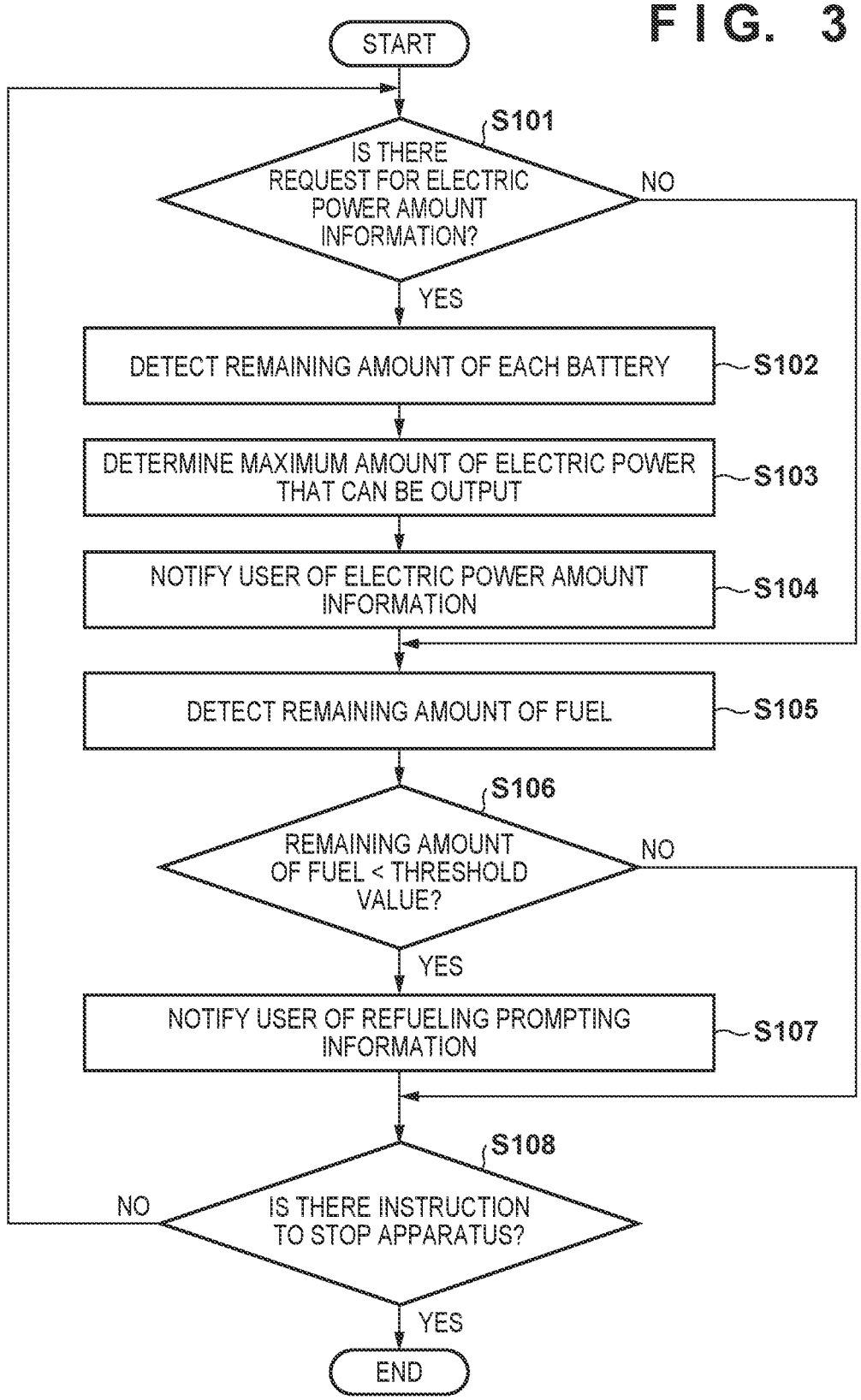
FIG. 3 is a flowchart illustrating an example of an information notification method in the electric power supply apparatus.

In the electric power supply apparatus 10 (hybrid generator) configured as described above, for example, the maximum amount of electric power that can be output can differ according to a capacity of each battery 31 housed in the container 30. Therefore, when supplying electric power to the external load 60, the user may want to ascertain the maximum amount of electric power that can be output from the electric power supply apparatus 10, for example, whether the maximum amount of electric power that can be currently obtained by the electric power supply apparatus 10 is adequate for supplying electric power to the external load 60. Therefore, the electric power supply apparatus 10 according to the present embodiment can be configured to notify the user (information terminal 70) of various types of information including the maximum amount of electric power. Hereinafter, a method of notifying the information in the electric power supply apparatus 10 according to the present embodiment will be described. FIG. 3 is a flowchart illustrating an example of a method of notifying the information in the electric power supply apparatus 10 according to the present embodiment. The flowchart illustrated in FIG. 3 may be started in a case where the electric power supply apparatus 10 is started. In addition, the processing unit 50 can perform each step.

Figure 4:
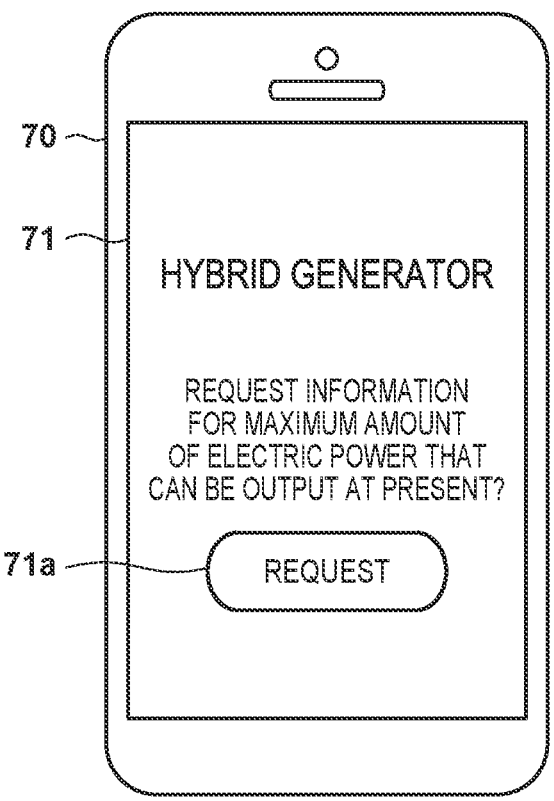
FIG. 4 is a diagram illustrating an example of display of information on a display of an information terminal.

In step S101, the processing unit 50 (communication unit 55) determines whether information on the maximum amount of electric power that can be output from the electric power supply apparatus 10 (hereinafter, may be referred to as the electric power amount information) has been requested. For example, the user can start an application program related to a notification of the electric power amount information on the information terminal 70 and request the electric power amount information from the application program. FIG. 4 illustrates an example of display of the display 71 on the information terminal 70 in a case where the application program is started. The user can request the electric power amount information by touching a request button 71a displayed on the display 71. When a signal requesting for the electric power amount information is received from the information terminal 70, the processing unit 50 can determine that the electric power amount information has been requested. In a case where the electric power amount information has been requested, the processing proceeds to step S102, and in a case where the electric power amount information has not been requested, the processing proceeds to step S105.

In step S102, the processing unit 50 (first detection unit 52) detects the remaining amount of each battery 31 housed in the container 30. At this time, the first detection unit 52 may detect the number of batteries 31 stored in the container 30. Next, in step S103, the processing unit 50 (determination unit 54) determines (calculates) the maximum amount of electric power that can be output from the electric power supply apparatus 10 at present (at a present point of time) on the basis of the remaining amount of each battery 31 detected in step S102. For example, the determination unit 54 obtains an amount of electric power that can be output from each battery 31 housed in the container 30 on the basis of a detection result in step S102. In addition, the determination unit 54 may cause the second detection unit 53 to detect the remaining amount of the fuel in the fuel tank 21 and obtain the amount of electric power that can be generated by the engine generator 20 on the basis of a detection result of the second detection unit 53. As a result, the determination unit 54 can determine the maximum amount of electric power that can be output from the electric power supply apparatus 10. Furthermore, the determination unit 54 may determine the type of the external load 60 to which electric power can be supplied by the electric power supply apparatus 10 on the basis of the determined maximum amount of electric power. For example, the determination unit 54 manages (stores), in advance, information indicating a correspondence relationship between the type of the external load and an amount of electric power required for the type of the external load 60 and use the information, whereby the determination unit 54 can determine the type of the external load 60 on the basis of the determined maximum amount of electric power.

Figure 5:
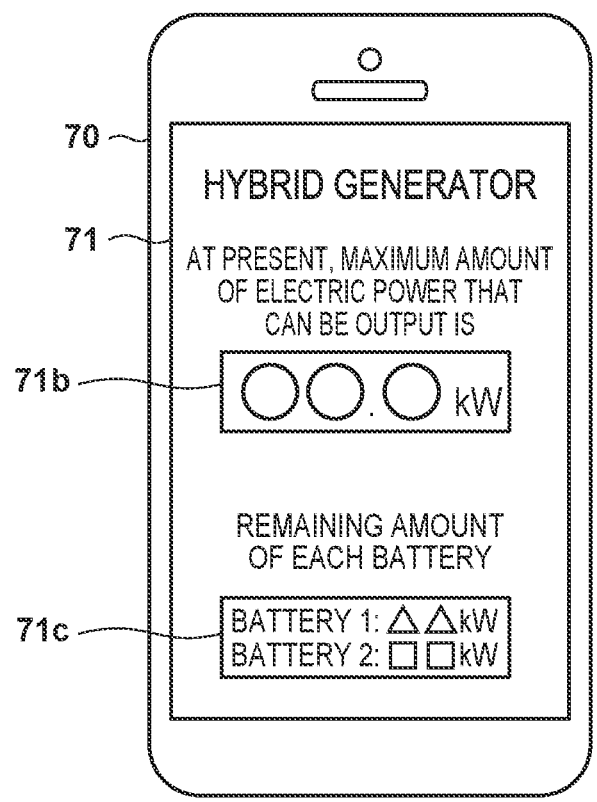
FIG. 5 is a diagram illustrating an example of display of information on the display of the information terminal.

In step S104, the processing unit 50 (communication unit 55) transmits information indicating the maximum amount of electric power (electric power amount information) determined in step S103 to the information terminal 70 via the network or the like, thereby notifying the user of the information indicating the maximum amount of electric power. FIG. 5 illustrates an example of display (example of a notification) of the electric power amount information on the display 71 of the information terminal 70. In the example of display illustrated in FIG. 5, a display field 71b for the electric power amount information is provided. Such a notification of the electric power amount information allows the user to easily ascertain the maximum amount of electric power that can be output from the electric power supply apparatus 10. In addition, in this step S104, the processing unit 50 may notify the user (information terminal 70) of information indicating the remaining amount of each battery 31 detected by the first detection unit 52 in step S102. In the example of display illustrated in FIG. 5, a display field 71c for information indicating the remaining amount of each battery 31 is also provided. Furthermore, in a case where the type of the external load 60 to which electric power can be supplied by the electric power supply apparatus 10 is determined in step S103, the processing unit 50 may notify the user (information terminal 70) of the type of the external load 60.

In step S105, the processing unit 50 (second detection unit 53) detects the remaining amount of the fuel in the fuel tank 21 by the second detection unit 53. Next, in step S106, the processing unit 50 determines whether the remaining amount of the fuel detected by the second detection unit 53 in step S105 is less than a threshold value. The "threshold value" can be set to any value, and as an example, can be set to a remaining amount of the fuel for which the operable time of the engine generator 20 (engine 22) is about several tens of minutes to several hours (for example, 30 minutes to two hours) in a case where electric power is supplied to the external load 60 using only the generator 23. In a case where the remaining amount of the fuel is less than the threshold value, the processing proceeds to step S107, and in a case where the remaining amount of the fuel is the threshold value or more, the processing proceeds to step S108.

Figure 6:
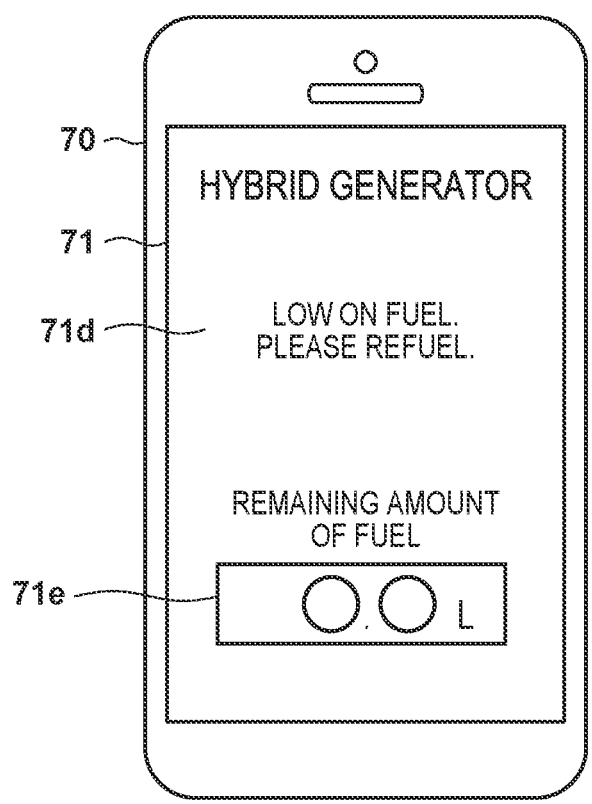
FIG. 6 is a diagram illustrating an example of display of information on the display of the information terminal.

In step S107, the processing unit 50 (communication unit 55) transmits information for prompting refueling (hereinafter, may be referred to as the refueling prompting information) to the information terminal 70 via the network or the like, thereby notifying the user of the refueling prompting information. FIG. 6 illustrates an example of display (example of a notification) of the refueling prompting information on the display 71 of the information terminal 70. In the example of display illustrated in FIG. 6, a display field 71d for the refueling prompting information is provided. Such a notification of the refueling prompting information allows the user to ascertain that an amount of the fuel has decreased and allows the user to easily ascertain a timing of refueling. In addition, in step S107, the processing unit 50 may notify the user of information on the remaining amount of the fuel itself detected by the second detection unit 53 in step S104. In the example of display illustrated in FIG. 6, a display field 71e for information indicating the remaining amount of the fuel is also provided.

In step S108, the processing unit 50 determines whether an instruction to stop the electric power supply apparatus 10 has been given. For example, in a case where a power button provided in the electric power supply apparatus 10 is pressed or in a case where a stop signal is transmitted from the information terminal 70 of the user via the network or the like, the processing unit 50 can determine that the stop instruction has been given. In a case where the stop instruction has been given, the electric power supply apparatus 10 is stopped and the flowchart is ended. On the other hand, in a case where the stop instruction has not been given, the processing returns to step S101.

As described above, the electric power supply apparatus 10 of the present embodiment notifies the user of the maximum amount of electric power that can be output from the electric power supply apparatus 10 on the basis of a detection result of the remaining amount of each battery 31 housed in the container 30. As a result, since the user can easily ascertain the maximum amount of electric power, the user can determine whether it is appropriate to use the electric power supply apparatus 10 for the external load 60 to which electric power is scheduled to be supplied. In other words, the electric power supply apparatus 10 according to the present embodiment can improve the convenience of the user by the configuration described above.

Summary of Embodiment

1. An electric power supply apparatus of the above-described embodiment is an electric power supply apparatus (e.g. 10) that supplies power to an external load (e.g. 60), and comprises:
a generator (e.g. 20) capable of generating electric power by motive power of an engine (e.g. 22);
a container (e.g. 30) capable of housing a battery (e.g. 31);
first detecting means (e.g. 52) for detecting a remaining amount of the battery housed in the container;
determining means (e.g. 54) for determining a maximum amount of electric power that can be output from the electric power supply apparatus, on the basis of a result of detection by the first detecting means; and
notifying means (e.g. 55) for notifying a user of the maximum amount of electric power determined by the determining means.
Since this embodiment allows the user to easily ascertain the maximum amount of electric power of the electric power supply apparatus, the user can determine whether it is appropriate to use the electric power supply apparatus for the external load to which electric power is scheduled to be supplied. In other words, the convenience of the user can be improved.

2. In the above-described embodiment,
the determining means determines the maximum amount of electric power by obtaining an amount of electric power that can be output from the battery housed in the container and an amount of electric power that can be output from the generator.
This embodiment allows for accurate determination (calculation) of the maximum amount of electric power that can be output from the electric power supply apparatus.

3. In the above-described embodiment,
the determining means determines a type of the external load to which electric power can be supplied by the electric power supply apparatus on the basis of the maximum amount of electric power, and
the notifying means notifies the user of the type of the external load determined by the determining means.
This embodiment allows the user to easily ascertain the type of the external load appropriate for supplying power by the electric power supply apparatus.

4. In the above-described embodiment,
the notifying means notifies the user of the remaining amount of the battery detected by the first detecting means.
Since this embodiment allows the user to ascertain an actual remaining amount of the battery, the user also can ascertain how much the battery is charged.

5. In the above-described embodiment,
the electric power supply apparatus further comprises a tank (e.g. 21) that stores fuel of the engine; and second detecting means (e.g. 53) for detecting a remaining amount of the fuel in the tank, wherein
the notifying means notifies the user of information for prompting refueling in a case where the remaining amount of the fuel detected by the second detecting means is less than a threshold value.
This embodiment allows the user to ascertain that the amount of the fuel has decreased and allows the user to easily ascertain a timing of refueling.

6. In the above-described embodiment,
the electric power supply apparatus further comprises a tank (e.g. 21) that stores fuel of the engine; and the second detecting means (e.g. 53) for detecting the remaining amount of the fuel in the tank, wherein
the notifying means notifies the user of the remaining amount of the fuel detected by the second detecting means.
This embodiment allows the user to ascertain that the amount of the fuel has decreased and allows the user to easily ascertain a timing of refueling.

7. In the above-described embodiment,
the container is configured to be able to house a plurality of the battery.
This embodiment allows the plurality of batteries to be charged by the power from the generator and allows the power supply to the external load to be more efficiently controlled in the electric power supply apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electric power supply apparatus that supplies power to an external load, comprising:
a generator configured to generate electric power by motive power of an engine;
a container configured to house a battery;
a first detector configured to detect a remaining amount of the battery housed in the container; and
a processor configured to:
calculate an amount of electric power that can be generated by the generator, on the basis of an actual measurement value of an amount of electric power generated by the generator during a period from present time to a predetermined period ago;
determine a maximum amount of electric power that can be output from the electric power supply apparatus at a present point of time in a case of using both electric power from the generator and electric power from the battery, on the basis of the remaining amount of the battery detected by the first detector and the calculated amount of electric power; and notify a user of the determined maximum amount of electric power.

2. The electric power supply apparatus according to claim 1, wherein the processor is configured to determine the maximum amount of electric power by obtaining an amount of electric power that can be output from the battery housed in the container and an amount of electric power that can be output from the generator.

3. The electric power supply apparatus according to claim 1, wherein the processor is configured to:

determine a type of the external load to which electric power can be supplied by the electric power supply apparatus on the basis of the maximum amount of electric power, and notify the user of the type of the determined external load.

4. The electric power supply apparatus according to claim 1, wherein the processor is configured to notify the user of the remaining amount of the battery detected by the first detector.

5. The electric power supply apparatus according to claim 1, further comprising:

a tank that stores fuel of the engine; and a second detector configured to detect a remaining amount of the fuel in the tank, wherein the processor is configured to notify the user of information for prompting refueling in a case where the remaining amount of the fuel detected by the second detector is less than a threshold value.

6. The electric power supply apparatus according to claim 1, further comprising:

a tank that stores fuel of the engine; and a second detector configured to detect a remaining amount of the fuel in the tank, wherein the processor is configured to notify the user of the remaining amount of the fuel detected by the second detector.

7. The electric power supply apparatus according to claim 1, wherein the container is configured to be able to house a plurality of the battery.

8. The electric power supply apparatus according to claim 1, further comprising a communication unit configured to be communicably connected with an information terminal of a user, wherein the processor is configured to determine the maximum amount of electric power in a case of receiving a request of information on the maximum amount of electric power from the information terminal by the communication unit, and notify the user of the determined maximum amount of electric power by transmitting information on the determined maximum amount to the information terminal by the communication unit.

9. The electric power supply apparatus according to claim 1, wherein the electric power supply apparatus is configured as a stationary type.

10. The electric power supply apparatus according to claim 1, further comprising:

a tank that stores fuel of the engine; and a second detector configured to detect a remaining amount of the fuel in the tank, wherein the processor is configured to calculate the amount of electric power that can be generated by the generator, on the basis of the remaining amount of the fuel detected by the second detector.

* * * * *